Feb. 14, 1961
R. A. PETRUSEK
2,971,647
AUTOMATIC SAND WASHER
Filed Oct. 9, 1956
2 Sheets-Sheet 1
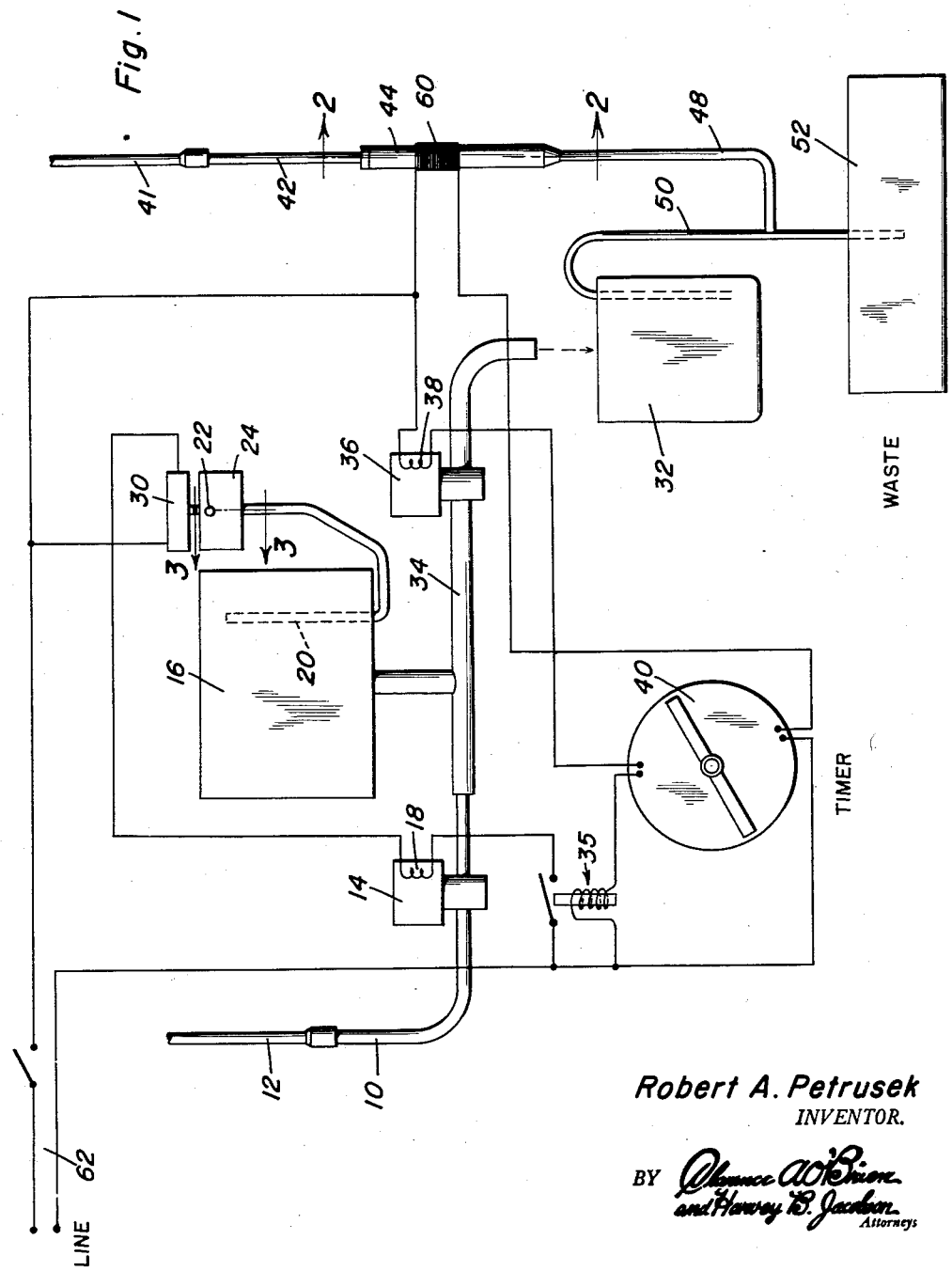
Robert A. Petrusek
INVENTOR.

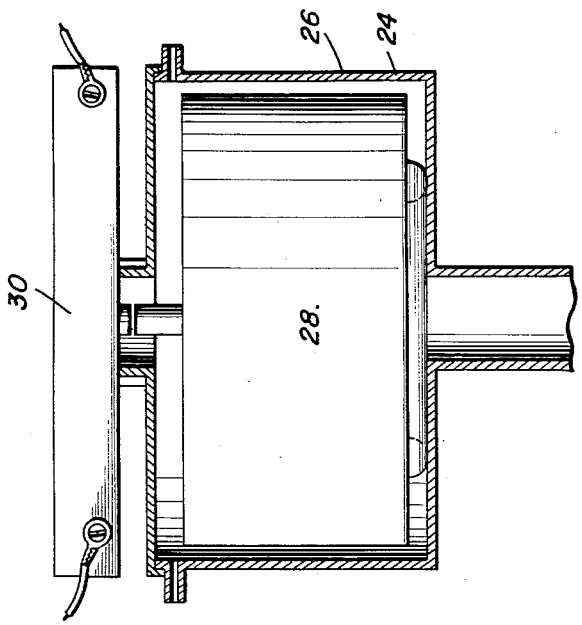
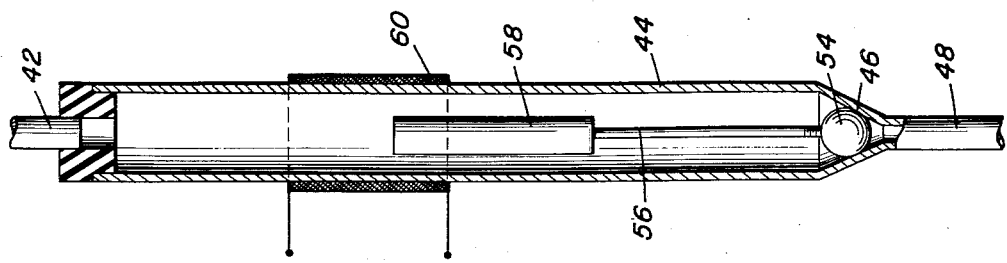

United States Patent Office 2,971,647
Patented Feb. 14, 1961

2,971,647
AUTOMATIC SAND WASHER

Robert A. Petrusek, Arlington, Va.
(Rte. 1, Steenson Hollow, Sheffield, Ala.)

Filed Oct. 9, 1956, Ser. No. 614,894

5 Claims. (Cl. 209—209)

This invention relates to the class of electrical testing apparatus, and more particularly to an automatic sand washer.

The primary object of the present invention resides in the provision of means for performing automatically steps in measuring the clay content of molding sand.

The determination of clay content of molding sand in foundries and foundry laboratories is performed by the use of standard American Foundry Society clay content testers. Clay is defined by the American Foundry Society as anything that will not settle in still water at a rate faster than one inch per minute. In using the standard clay content tester, a sample of molding sand is placed in a dry cylinder and suitable distilled water is added to fill the cylinder to a proper height. The mixture of clay, sand and water is agitated and allowed to settle for a suitable period. At the end of this period, the laboratory technician performing the test syphons off a suitable amount of the fluid, depending on the period during which the mixture has been allowed to settle, and then refills the cylinder to a proper height and subsequently allows the mixture to again settle. Sufficient stirring action is accomplished by the water as it is poured into the cylinder. At the end of the next interval, water is again syphoned off and more water is added. This cycle of pouring distilled water into the cylinder, allowing the mixture of sand, clay and water to settle for a period and then syphoning off a suitable amount of the water and starting the cycle over continues until the mixture is clear, not murky. This phase of the test may require a considerable expenditure of time and effort on the part of the laboratory technician whose presence is necessary for correct timing and syphoning action. Once the mixture is clear, the excess water is drawn off and the sand dried and weighed. The loss in weight is reported as clay content. The present invention eliminates the necessity for the presence of the laboratory technician during the various cycles of adding water and then syphoning the water off.

The construction of this invention features novel time or control means for intermittently filling a receptacle and then drawing the fluid from the receptacle after the fluid has been allowed to settle. This means includes a highly effective syphoning structure as well as efficient means for introducing fluid into the receptacle forming a part of the clay content tester.

Still further objects and features of this invention reside in the provision of an automatic sand washer for the standardized American Foundrymen Society's test of the clay content of molding sand that is simple in construction, easy to operate and inexpensive to produce, thereby permitting wide distribution and utilization in this field.

These, together with the various ancillary objects and features of the invention which will become apparent as the following description proceeds, are attained by this automatic sand washer, a preferred embodiment of which has been illustrated in the accompanying drawings, by way of example only, wherein:

Figure 1 is a schematic diagram illustrating the construction of the various elements of the invention;

Figure 2 is a vertical sectional detail view as taken along the plane of line 2—2 in Figure 1 and illustrating the construction of the syphoning means in detail; and Figure 3 is an enlarged sectional detail view as taken along the plane of line 3—3 in Figure 1 illustrating the construction of the valve means for controlling the amount of flow of fluid.

With continuing reference to the accompanying drawings, wherein like reference numerals designate similar parts throughout the various views, and with initial attention directed to Figure 1, it will be noted that there is provided an intake conduit 10 which is adapted to be connected through a rubber hose 12 or any other suitable connector to a source of distilled water such as a water jug or the like. A solenoid actuated valve 14 is provided in the conduit 10 for controlling the flow of fluid through the conduit 10 to a closed reservoir 16. The solenoid type valve 14 is of conventional construction and is controlled by means of excitation of coil 18.

When the valve 14 is opened, flow of fluid through the conduit 10 will cause the reservoir 16 to become filled. Entrapped air in the reservoir 16 will pass out through conduit 20 and thence out of an opening, as at 22, formed in an actuator 24 to which the conduit 20 is connected. As can be seen best in Figure 3, the actuator 24 includes a housing 26 having a float 28 mounted therein. There is also provided a microswitch 30 which is operated upon the rise of the float 28. When, by gravity flow through the conduit 10, the reservoir 16 becomes filled with fluid, the fluid will flow through the conduit 20 and into the housing 26, causing the float 28 to rise and actuating the microswitch 30. When the microswitch 30 is actuated, the circuit through the coil 18 will be interrupted closing the valve 14, cutting off the flow of distilled water into the reservoir 16 and into the housing 26.

Connecting the reservoir 16 with a receptacle 32 formed by the standard American Foundrymen Society tester is a conduit 34. The receptacle 32 is located directly below the outlet of the conduit 34. A solenoid valve 36, similar to the solenoid valve 14 and controlled by excitation of the coil 38, controls flow of fluid through the conduit 34 and, like the valve 14, the valve 36 is controlled by any suitable timing means, such as the timer 40. When the proper time arrives to fill the receptacle 32, the timer 40 opens the solenoid valve 36 and distilled water in the reservoir 16 flows out into the receptacle 32 through conduit 34. Water in the housing 24 drains back to the reservoir 16. Since this flow of fluid out of the reservoir 16 will cause the microswitch 30 to cause the valve 14 to open, a simple relay 35 is employed in a series type electrical connection which prevents the valve 14 from opening whenever the valve 36 is open.

Valve 36 remains open for a suitable period as determined by the timer, after which time it closes. The valve 14 then opens so as to fill the reservoir 16. At the end of this interval, a suitable vacuum apparatus of any convenient construction is actuated and this vacuum-inducing apparatus, not shown, may be controlled by the timer 40 or any other suitable timing means. The vacuum-inducing apparatus may be connected by a suitable hose 41 to a conduit 42 which is connected to a cylindrical member 44 forming the main syphoning means of the invention. This syphoning means, which can be best seen in Figure 2, includes the cylindrical valve chamber 44 which has a valve seat 46 which may be integrally formed therewith and which has a conduit 48 connecting the chamber 44 to a conduit 50 which extends into the receptacle 32 a predetermined distance so as to assure that a given amount of fluid in the receptacle 32 will be syphoned off due to the action of the syphoning means. An overflow tank 52 is, of course, provided.

Within the chamber 44 is a valve member 54 which may be made of soft rubber, or the like, and which is connected by means of a rod 56 to a soft iron core 58 which is adapted to be actuated by a coil 60 connected to the source of electrical supply, as at 62, and which is controlled by the timer 40 or any other convenient timing means. When the valve 54 is lifted off the valve seat 56, the vacuum-inducing means can cause syphoning action and the withdrawal of fluid from the receptacle 32.

The cycle of operation repeats after each given interval so that, after each settling period, a known amount of fluid is added to the receptacle 32 and then syphoned off to a predetermined level, thereby removing and automatically washing the sand until the clay content thereof has been removed.

Based upon the requirement that the material to be removed will not settle in still water at a rate faster than 1 inch per minute, the structure illustrated in Figure 1 will have the relationships specifically described below. The capacity of the reservoir 16 will be such that when it is completely filled and then emptied into the receptacle 32, sufficient water will be added to the receptacle 32 to raise the level five inches above the level of the inlet to the syphon tube 50. The timer will be set to operate the valve 54 so as to withdraw the water by the syphon 50 from the receptacle 32 after the suspended material in the water has been allowed to settle for five minutes. Thus, material which is at the surface of the water at the beginning of the five minutes' period will have settled below the level of the intake port of the syphon at the end of five minutes if its rate of settling is faster than one inch per minute. It thus becomes important to correlate the level of the intake of the syphon 50 and the level to which water fills the receptacle 32, which of course depends upon the capacity of the reservoir 16.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An automatic sand washer comprising a receptacle for sand to be washed, a syphon tube having an intake port in said receptacle at a predetermined level therein, water supply means including a valve for admitting only a measured quantity of water to said receptacle to raise the water level therein an exactly predetermined height above the syphon inlet port, a syphon control device, and an automatic timer connected to said valve and said syphon control device to initiate syphon operation a predetermined interval after completion of admission of water to said receptacle to syphon off water and suspended particles therein to the level of the syphon intake after a predetermined settling period, said automatic timer being operable to provide continuously repeated cycles of water addition, a settling period, and syphon withdrawal of water from said receptacle.

2. An automatic sand washer comprising a receptacle for sand to be washed, a syphon tube having an intake port in said receptacle at a predetermined level therein, water supply means including a solenoid valve for admitting only a measured quantity of water to said receptacle to raise the water level therein an exactly predetermined height above the syphon inlet port, a solenoid actuated syphon control device, and an automatic timer including switch means connected to said solenoid valve and solenoid actuated syphon control device to initiate syphon operation a predetermined interval after completion of admission of water to said receptacle to syphon off water and suspended particles therein to the level of the syphon intake after a predetermined settling period, said automatic timer being operable to provide continuously repeated cycles of water addition, a settling period, and syphon withdrawal of water from said receptacle.

3. An automatic sand washer comprising a receptacle for sand to be washed, a syphon tube having an intake port in said receptacle at a predetermined level therein, water supply means for admitting only a measured quantity of water to said receptacle to raise the water level therein an exactly predetermined height above the syphon inlet port, said water supply means including a measuring reservoir, automatic means for accumulating an exactly measured quantity of water in said reservoir, a passage leading from said reservoir to said receptacle and a valve in said passage; a syphon control device, and an automatic timer connected to said valve and said syphon control device to initiate syphon operation a predetermined interval after completion of admission of all of the same water from said reservoir to said receptacle to syphon off water and suspended particles therein to the level of the syphon intake after a predetermined settling period, said automatic timer being operable to provide continuously repeated cycles of water addition, a settling period, and syphon withdrawal of water from said receptacle.

4. Fully automatic mechanism for washing sand to remove clay therefrom comprising a water measuring reservoir having inlet and outlet connections thereto, a solenoid inlet valve in said inlet connection, a solenoid outlet valve in said outlet connection, a switch responsive to liquid level in said reservoir effective to close said inlet valve when the liquid reaches a predetermined level in said reservoir, a receptacle in position to receive liquid from said outlet connection, a relay responsive to opening of said outlet valve operable to maintain said inlet valve closed while said outlet valve is open, a syphon having an inlet port at a predetermined level in said receptacle, a solenoid actuated syphon starter, and a cycling timer comprising a switch for opening said outlet valve to deliver a measured quantity of water to said receptacle, a second switch for actuating said syphon starter, and timing means for maintaining a predetermined interval between operation of said first and second switches to establish a settling period for the sand-clay suspension in said receptacle.

5. Fully automatic mechanism for washing sand to remove clay therefrom comprising a water measuring reservoir having inlet and outlet connections thereto, a solenoid inlet valve in said inlet connection, a solenoid outlet valve in said outlet connection, a switch responsive to liquid level in said reservoir effective to close said inlet valve when the liquid reaches a predetermined level in said reservoir, a receptacle in position to receive liquid from said outlet connection, said outlet connection being disposed to agitate the material in said receptacle by delivery of water thereto to produce a suspension of sand and clay particles therein, a relay responsive to opening of said outlet valve operable to maintain said inlet valve closed while said outlet valve is open, a syphon having an inlet port at a predetermined level in said receptacle, a solenoid actuated syphon starter, and a cycling timer comprising a switch for opening said outlet valve to deliver a measured quantity of water to said receptacle, a second switch for actuating said syphon starter, and timing means for maintaining a predetermined interval between operation of said first and second switches to establish a settling period for the sand-clay suspension in said receptacle.

(References on following page)

References Cited in the file of this patent

UNITED STATES PATENTS

| | | |
|---|---|---|
| 831,059 | Greth | Sept. 18, 1906 |
| 1,030,378 | Beckwith | June 25, 1912 |
| 1,150,013 | Bordo | Aug. 17, 1915 |
| 1,383,167 | Stenberg | June 28, 1921 |
| 1,627,734 | Gavaza | May 10, 1927 |
| 1,673,690 | Lawson | June 12, 1928 |
| 2,124,053 | Coates | July 19, 1938 |
| 2,364,321 | Sheck | Dec. 5, 1944 |
| 2,418,751 | Brewer | Apr. 8, 1947 |
| 2,606,690 | Hansen | Aug. 12, 1952 |
| 2,621,666 | Ornas | Dec. 16, 1952 |
| 2,646,061 | Bottum | July 21, 1953 |
| 2,665,706 | Hansen | Jan. 12, 1954 |
| 2,764,992 | Reynolds et al. | Oct. 2, 1956 |
| 2,784,563 | Baker | Mar. 12, 1957 |
| 2,855,098 | Jameson et al. | Oct. 7, 1958 |
| 2,887,227 | Dunham | May 19, 1959 |